A. HERTLEIN.
UNDERGROUND CONDUCTOR FOR ELECTRIC RAILWAYS.
APPLICATION FILED DEC. 10, 1915.
1,197,372.                                                                 Patented Sept. 5, 1916.
Fig. 1.
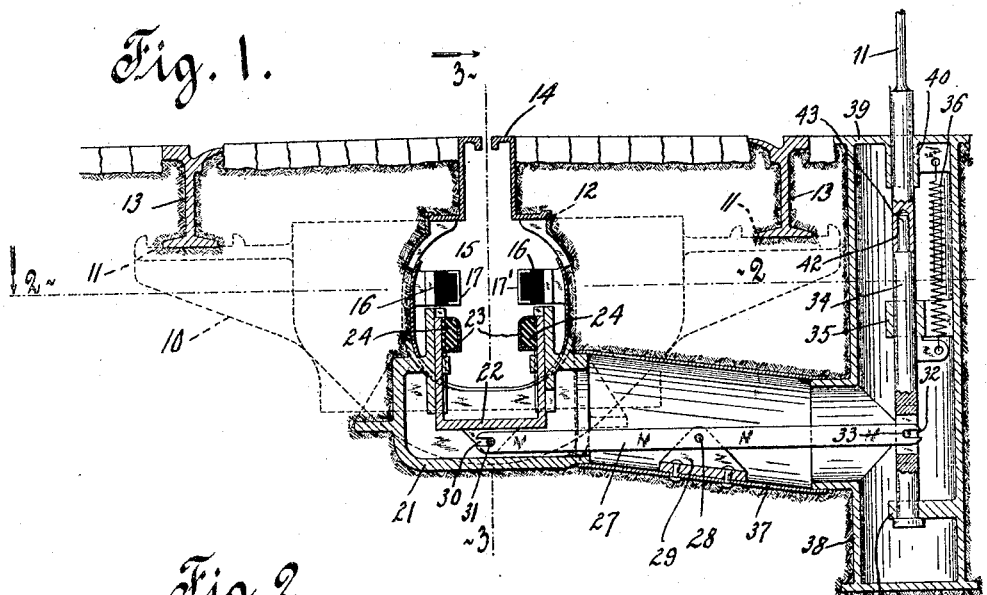
Fig. 2.
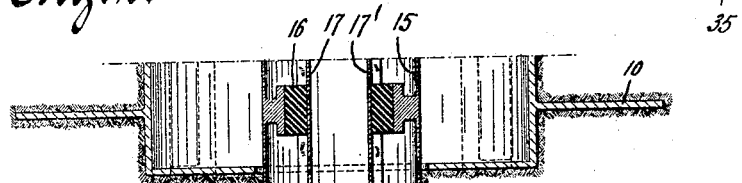
Fig. 3.
Fig. 4.
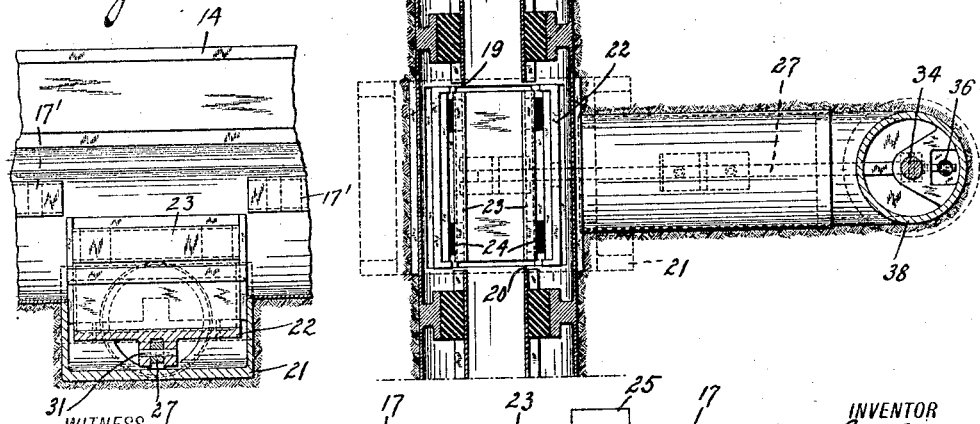
INVENTOR
A. Hertlein
BY
Sigmund Herzog
his ATTORNEY

UNITED STATES PATENT OFFICE.

ADAM HERTLEIN, OF NEW YORK, N. Y.

UNDERGROUND CONDUCTOR FOR ELECTRIC RAILWAYS.

1,197,372.   Specification of Letters Patent.   Patented Sept. 5, 1916.

Application filed December 10, 1915. Serial No. 66,109.

*To all whom it may concern:*

Be it known that I, ADAM HERTLEIN, a citizen of the United States, and a resident of the city of New York, in the county of New York and State of New York, have invented certain new and useful Improvements in Underground Conductors for Electric Railways, of which the following is a specification.

The present invention relates to an underground conductor for electric street railways.

The underground conductors of electric railways are usually disposed in a conduit, that is provided with a slot, in alinement with the slotted rail of the track. Through this rail and slot extend the current collecting shoes or plows upon the cars. In the conduit there are usually mounted two parallel conductors, each of which is divided, for the well known purpose, into insulated sections. The length of an insulator between adjoining sections of a conductor is such that a current collector cannot make electric connections between two adjacent insulated sections. As a car travels along the conduit, it happens sometimes that it is stalled at the insulator between two conductor sections. In such case usually a portable current collector is made use of to supply current to the motors upon the cars. The use of a portable collector, however, involves great trouble inasmuch as, before applying the same, the automatic circuit breakers on the car must be tripped, power must be kept off in the controller until the portable collector has been connected to the conductors in the circuit, and so on. It has been found that much damage is caused by the improper use of the hand current collectors unless great care is taken in inserting the same into the electric circuit, and also in disconnecting the same therefrom.

The main object of the present invention is to obviate these defects of the underground conductors by providing a simple attachment, forming part of the electric circuit, which can be conveniently shifted both into its operative and inoperative positions, and which, when in its operative position, furnishes current to the stalled car on a section insulator.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawing, in which:—

Figure 1 is a transverse vertical section taken through the track and underground conduit of an electric street railway, provided with the attachment forming the subject matter of the present application for Letters Patent; Fig. 2 is a section taken on line 2—2 of Fig. 1; Fig. 3 is a section taken on line 3—3 of Fig. 1; and Fig. 4 is a diagram of the electric circuits.

In the drawings, a street railway track of the usual construction is shown, comprising transversely disposed brackets or yokes 10, which are placed at intervals; each bracket or yoke being provided at its upper edge with recesses 11 and 12 for the reception of the track rails 13 and the slotted rail 14, respectively. In each bracket is formed a conduit opening 15, in which are disposed the conductor supports 16. These supports are insulated from the brackets, and have attached thereto the positive and negative conductors 17 and 17'. The conductors are located in a conduit 18, that is made in sections, each section connecting the conduit openings of two adjacent brackets. Thus far the construction and operation of the elements described do not vary in any essential way from those generally in use.

The conductors 17 and 17' are each made in sections of any suitable length, these sections being fed from conductors not shown in the drawings. Adjacent sections of the conductors 17 are insulated by providing therebetween a gap 19, each gap being longer than the length of a current collector upon a car. In a similar manner are provided gaps 20 between adjacent sections of the conductor 17'. The gaps 19 and 20 are preferably of the same length and in alinement with each other, as clearly shown in Fig. 2 of the drawings. Below each pair of gaps is disposed a casing 21, in which is vertically slidable a support 22, that is preferably U-shaped in cross section, upon each of its vertical walls being mounted a short conductor 23, insulated therefrom by blocks 24. These conductors are somewhat shorter than the gaps between the main conductor sections, and are normally disposed a substantial distance below said main sections but in the respective vertical planes thereof, as clearly appears from Fig. 1 of the drawings. The arrangement is such that when the short conductors are in their lower positions, a current collector in operative relation to the main conductors 17 and 17' does not contact with the short conductors 23. One of the short conductors 23 is electrically connected by a flexible conductor 25 with one of the adjacent sections of the conductor 17, and the other one by a flexible conductor 26 with the corresponding section of the conductor 17'.

The short conductors 23 are adapted to be shifted into alinement with the adjacent sections of the main conductors. This may be accomplished by any suitable means, one of which is disclosed in the drawings. This means comprises a lever 27, that is fulcrumed at 28 to a bracket 29, the inner end 30 of said lever being fork-shaped and in engagement with a pin 31 upon the support 22, its outer fork-shaped end 32 engaging a pin 33 upon a vertically disposed rod 34, that is slidably mounted in guides 35. A spring 36 serves to keep the rod 34 in its elevated position, in which the support 22 is in its lower position. The lever 27 and the rod 34 are disposed in housings 37 and 38, respectively, the housing 38 being provided in its head 39, that is flush with the ground, with an aperture 40, through which may be inserted an actuating bar 41, that is provided at its lower end with a socket 42, fitting the reduced upper end 43 of the bar 34. A device of the character described is located at each section insulator of the track, said devices being normally in the positions shown in Fig. 1 of the drawings.

The operation of the device herein described is as follows: If a car is stalled at a section insulator, its current collector is disposed in the gaps between the adjacent sections of the conductors. In order to supply current to the motor on the car, the actuating bar 41, which is preferably carried on each car, is inserted into the housing 38, so that the reduced end 43 of the rod 34 is seated in the socket 42 therein. The bar 41 is then depressed, whereby the support 22 is raised and the short sections 23 brought into alinement with the main conductor sections. As these short sections slide upward, they contact with the shoes carried by the current collector. Current is thus supplied to the motor on the car, whereby the latter can be carried over the section insulator. When the pressure is released from the actuating bar 41, the spring 36 returns the parts to their normal positions (Fig. 1).

It is obvious that, while herein a specific device has been described for shifting the short conductor sections into alinement with the main conductor sections, any other suitable means may be provided for the purpose at hand.

What I claim is:—

1. An underground conductor for electric railways, comprising fixed main sections having insulating gaps therebetween, short movable sections in said gaps normally disposed below the level of said main sections and electrically connected with one section adjacent thereto, and means for raising said short sections into the level of and in alinement with said main sections.

2. An underground conductor for electric railways, comprising fixed main sections having insulating gaps therebetween, a vertically shiftable support in the gaps between adjacent main sections, short sections carried by each support normally disposed below the level of said main sections and electrically connected with one section adjacent thereto, and means for raising said support and thereby shifting said short sections into the level of and in alinement with said main sections.

3. An underground conductor for electric railways, comprising fixed main sections having insulating gaps therebetween, short movable sections in said gaps normally disposed below the level of said main sections and electrically connected with one section adjacent thereto, and means for shifting said short sections into the level of and in alinement with said main sections.

4. An underground conductor for electric railways comprising fixed main sections having insulating gaps therebetween, short movable sections in said gaps normally out of alinement with said main sections and electrically connected with one section adjacent thereto, and means for shifting said short sections into alinement with said main sections.

Signed at New York, in the county of New York, and State of New York, this 4th day of Dec., A. D. 1915.

ADAM HERTLEIN.

Copies of this patent may be obtained for five cents each, by addressing the "Commissioner of Patents, Washington, D. C."